United States Patent [19]

Gillner et al.

[11] Patent Number: 4,978,207
[45] Date of Patent: Dec. 18, 1990

[54] TRAFFIC MIRROR

[75] Inventors: Manfred Gillner, Aachen; Josef Wlaschitsch, Bietigheim, both of Fed. Rep. of Germany; Werner Nuding, deceased, late of Bietigheim, Fed. Rep. of Germany, by Ursula Nuding, legal representative

[73] Assignee: Vegla Vereinigte Glaswerke GmbH, Aachen, Fed. Rep. of Germany

[21] Appl. No.: 362,761

[22] Filed: Jun. 7, 1989

[30] Foreign Application Priority Data

Jun. 30, 1988 [DE] Fed. Rep. of Germany ....... 3821997
Feb. 14, 1989 [DE] Fed. Rep. of Germany ... 8901679[U]

[51] Int. Cl.$^5$ .............................................. G02B 7/18
[52] U.S. Cl. ..................................... 350/631; 248/488
[58] Field of Search ............... 350/629, 631, 632, 636; 248/477, 479, 481, 485, 486, 487, 488

[56] References Cited

U.S. PATENT DOCUMENTS

| | | | |
|---|---|---|---|
| 2,185,084 | 12/1939 | Hutaff, Jr. ............................ | 248/488 |
| 3,200,705 | 8/1965 | Voelker et al. . | |
| 3,236,152 | 2/1966 | Alford ................................. | 248/481 |
| 4,178,065 | 12/1979 | Akerlund . | |

FOREIGN PATENT DOCUMENTS

| | | |
|---|---|---|
| 1988253 | 4/1968 | Fed. Rep. of Germany . |
| 7504467 | 2/1975 | Fed. Rep. of Germany . |
| 347112 | 7/1960 | Switzerland . |
| 487418 | 4/1970 | Switzerland . |

OTHER PUBLICATIONS

Brochure: Schach Dem Unfall, Moravia Veskehrsspiegel (1964).
Verkehrsspiegel der Sicherheit wegen.

*Primary Examiner*—Rodney B. Bovernick
*Assistant Examiner*—J. P. Ryan
*Attorney, Agent, or Firm*—Marmorek, Guttman & Rubenstein

[57] ABSTRACT

A traffic mirror comprises a spherically curved glass pane having a front surface, a rear surface, and an outer periphery, a metal reflective layer located on the inner surface of the glass pane, and a decorative frame located directly on the glass pane. The decorative frame is an enamel-like colored material which is baked onto the outer periphery of the glass pane. The traffic mirror further comprises a supporting structure for mounting the traffic mirror onto a vertical post. The supporting structure comprises at least two supporting struts which, are attached directly to the glass pane, for example, by bolts passing through bores in the glass pane itself. The glass pane is made from thermally prestressed single pane safety glass. The traffic mirror does away with the bulky frames used in prior art mirrors of this kind.

27 Claims, 5 Drawing Sheets

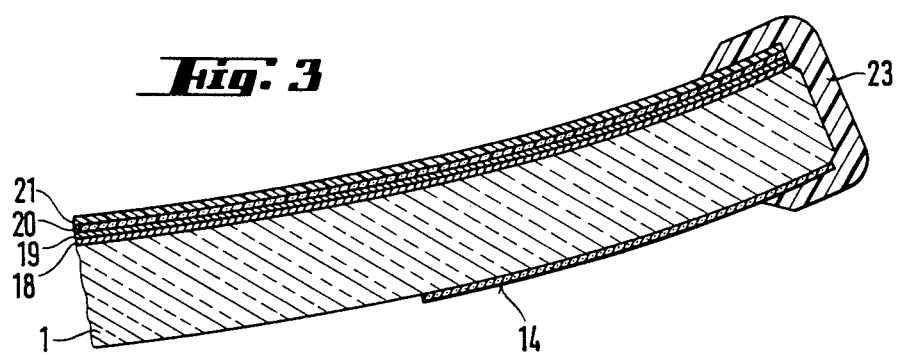
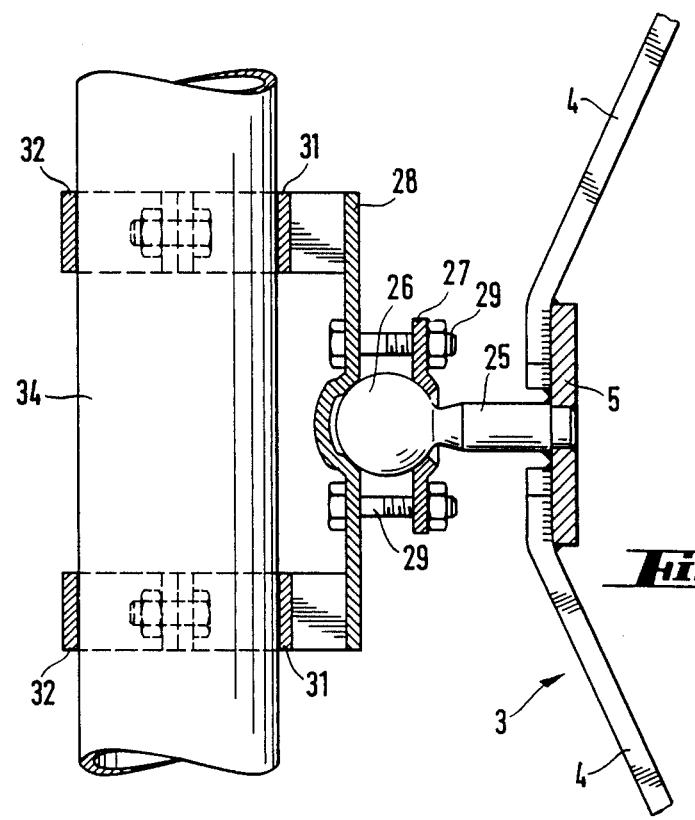

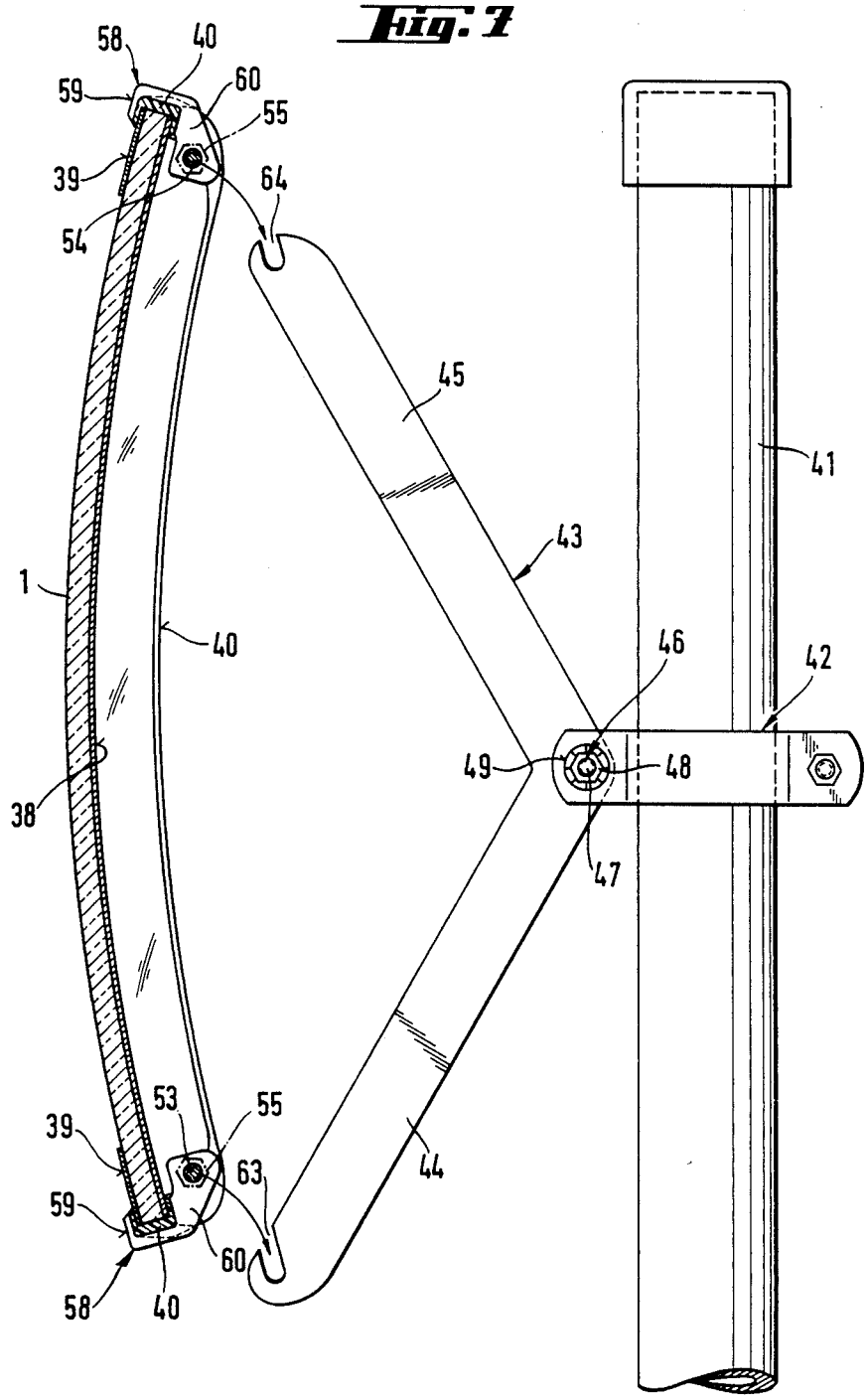

TRAFFIC MIRROR

BACKGROUND OF THE INVENTION

The instant invention relates to a traffic mirror, in particular to a spherically curved traffic mirror having a decorative frame and a metal support.

Traffic mirrors of this type are often installed at blind road sections so that a motorist can observe these road sections by means of the traffic mirror. In order to increase the field of vision, the mirror is as a rule spherically curved.

The known traffic mirrors of this type are enclosed in a supporting frame which is in turn connected to a suitable supporting or suspending device. The supporting frame can be made of a plastic material, for example. The mirror glass is attached in this plastic frame with a covering back, a massive frame part which is thicker than the back and with a border zone extending outward on all sides over the edges which is attached to the massive frame part. See, for example, Swiss Pat. No. 487,418. The attachment of the mirror glass is effected by means of holding corners which overlap the mirror glass at the corners and which are in turn screwed to the massive frame part. The border zone extending beyond the mirror glass has a decorative frame with alternating color strips forced thereon in order to attract the attention of road users to the mirror.

Another known traffic mirror consists of a metal box frame, e.g., made of galvanized iron sheet, which is provided on its face with surrounding fitting strips to hold the convex mirror glass. See, e.g., Swiss Pat. No. 347,112.

It is the object of the instant invention to create a traffic mirror of the type mentioned initially, but of simpler construction and without the frames of those known heretofore.

SUMMARY OF THE INVENTION

The mirror according to the instant invention is characterized by the following features:
 a. The mirror glass is spherically curved and is made of thermally pre-stressed single-pane safety glass;
 b. a metal reflective layer is located on the concave surface of the mirror glass and is protected by at least one layer of synthetic material against atmospheric corrosion effects;
 c. a decorative frame is located directly on the surface of the mirror glass in the form of a layer that strongly adheres to the surface; and
 d. a metal support comprises at least two struts which are provided at one end with means for attachment directly to the edge of the mirror glass, and at the other end with a link and a pipe clamp for attachment of the traffic mirror to a pipe-like post.

Through the combination of these inventive characteristics a traffic mirror is created for which an expensive frame construction is avoided. The decorative frame as well as the support are directly attached to the mirror glass itself. Aside from considerable simplification of design, the traffic mirror also lacks jutting frame parts and is especially attractive from an esthetic point of view.

Suitable embodiments and further developments of the invention can be found in the drawings and in the description below of different preferred embodiments.

BRIEF DESCRIPTION OF THE DRAWINGS

In the drawings,

FIG. 3 shows a section along line III—III of the embodiment in FIG. 1;

FIG. 4 shows an attachment device for the support of the traffic mirror shown in FIG. 1;

FIG. 7 shows a further embodiment of the traffic mirror similar to that of FIGS. 5 and 6 in a view partially shown in section.

DETAILED DESCRIPTION OF PREFERRED EMBODIMENTS

Figure 1:
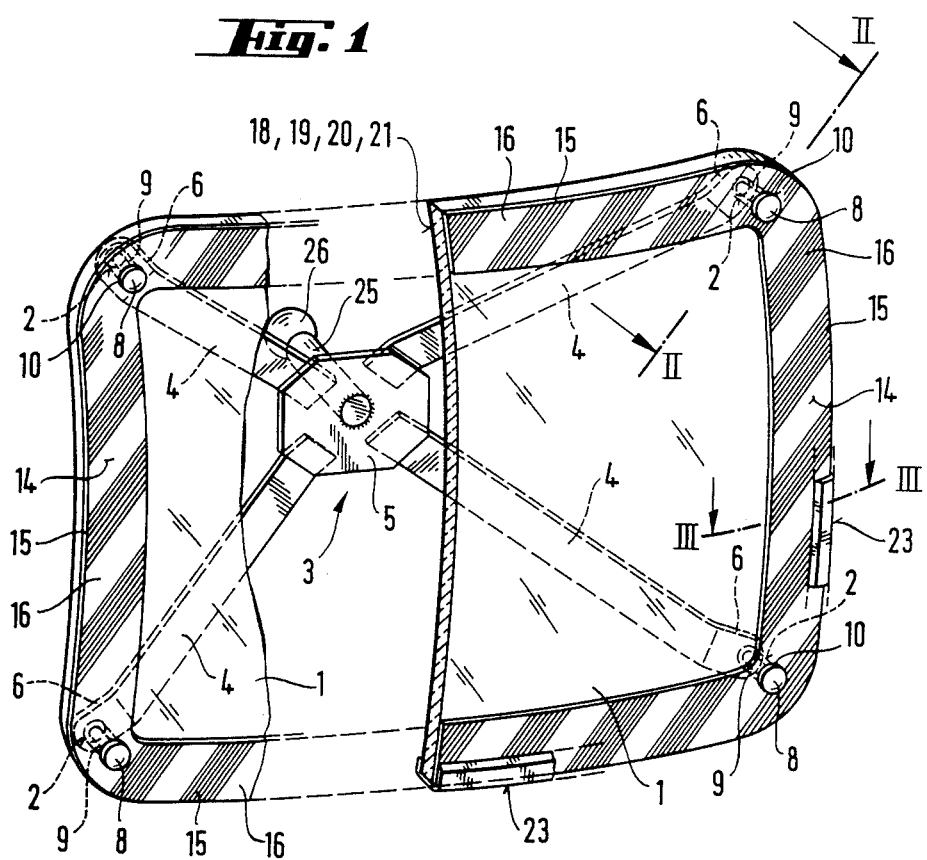
FIG. 1 shows a first embodiment of the traffic mirror in a perspective drawing, partially shown in a section.
Figure 2:
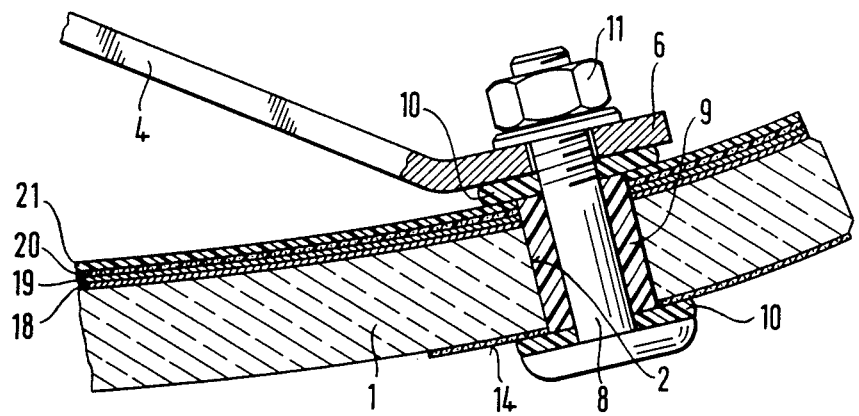
FIG. 2 shows a section along line II—II of the embodiment in FIG. 1.

Referring to FIGS. 1–4, the mirror glass 1 of the inventive traffic mirror can be in principle of any circumferential configuration and of any size. An essentially rectangular configuration with outer surface dimensions on the order of 40 to 120 cm is suitable.

The mirror glass 1 comprises a thermally prestressed silicate glass pane 4 to 8 mm thick and is spherically curved. The curvature of the glass pane is obtained through known processes by heating a flat glass pane cut out to the desired circumferential configuration to a temperature of approximately 600° to 650° C. and by bending with suitable bending tools.

The decorative frame 14 is applied in an adhesive manner to the convex, i.e., to the front surface of the mirror glass. Frame 14 consists of, for example, a durable and weatherproof layer of baked lacquer. The enamel-type baked colors which are poured on or baked in at the temperature required for the bending and pre-stressing of the mirror glass have been found to be especially well-suited. Baked colors suitable for this purpose are obtainable commercially. If such baked colors are used, as is especially advantageous because of their weatherproof properties, these colors are imprinted, preferably by a screen printing process on the glass pane before the bending process and are baked on as the glass pane is heated as required for bending.

In the case shown, the decorative frame 14 is made in two colors, with red areas 15 alternating with white areas 16. The decorative frame can of course be made in one color or in more than two colors. It is in particular possible to use colors with reflective properties, e.g., colors into which micro-spheres of glass are mixed.

The reflecting silver layer 18 is located on the concave, i.e., rear surface of the mirror glass 1. It is installed on the curved glass pane in a chemical wet process known in mirror manufacture. A metal copper layer 19 is placed on this silver layer 18, also in a chemical wet process. The copper layer 19 is covered with a weatherproof lacquer layer 20. It is also possible to laminate a plastic foil 21 covered with adhesive on this lacquer layer 20.

The mirror glass 1 is supported in frame profile 23 having a U-shaped cross-section on its circumferential surface. The frame profile 23 is suitably made of plastic or aluminum. It can adhere merely by clamping to the edges of the mirror glass 1 or can be attached to the edges of the mirror glass by means of a suitable adhesive. The frame profile 23 has on the one hand the function of a decorative frame and on the other hand serves to protect the metal mirror layer at the edges.

In the embodiments shown in FIGS. 1 to 4 the struts 4 of the mirror support are attached by means of screws 8 at the mirror periphery which is provided with bores 2 for that purpose. The bores 2 are drilled near the corners of the glass pane before said glass-pane is bent. The mirror support comprises four struts 4 which are attached at a junction plate 5. The ends 6 of the struts 4 are bent at an angle in such manner that they are approximately parallel to the corresponding surface area of the mirror glass 1 near the bores 2.

The ends 6 of the struts 4 are screwed to the mirror glass 1. A flat round cap screw 8 made of a non-corroding metal is used for the screw connection. In order to avoid any contact between screw 8 and the glass surface, a sleeve 9 made of an elastic synthetic material is installed in bore 2. Furthermore disk-shaped intermediary layers 10 made of an elastic synthetic material are inserted between the head of the screw 8 and the glass pane 1 as well as between the end 6 of the strut 4 and the glass pane. A nut 11 is used to screw the strut 4 to the glass pane 1. The elastic intermediary layers 9, 10 ensure that minimal deviations in shape are compensated for.

The traffic mirror 1 is normally attached to a vertically installed steel pipe or post 34. Since the inclination of the traffic mirror depends on local conditions and must be adjustable, an attachment device allowing the adjustment of the desired inclination is provided on the junction plate 5. The attachment device consists in the shown embodiment of a ball-end spindle 25, 26 and of a ball support made of two plates 27, 28 interacting with the ball 26. The plates 27, 28 are held together by screws 29 while holding the ball 26 between them. Two pipe clamps 31 are attached to the plate 28 and serve to attach the attachment device by mean of the pipe clamp halves 32 to the steel pipe 34.

Figure 5:
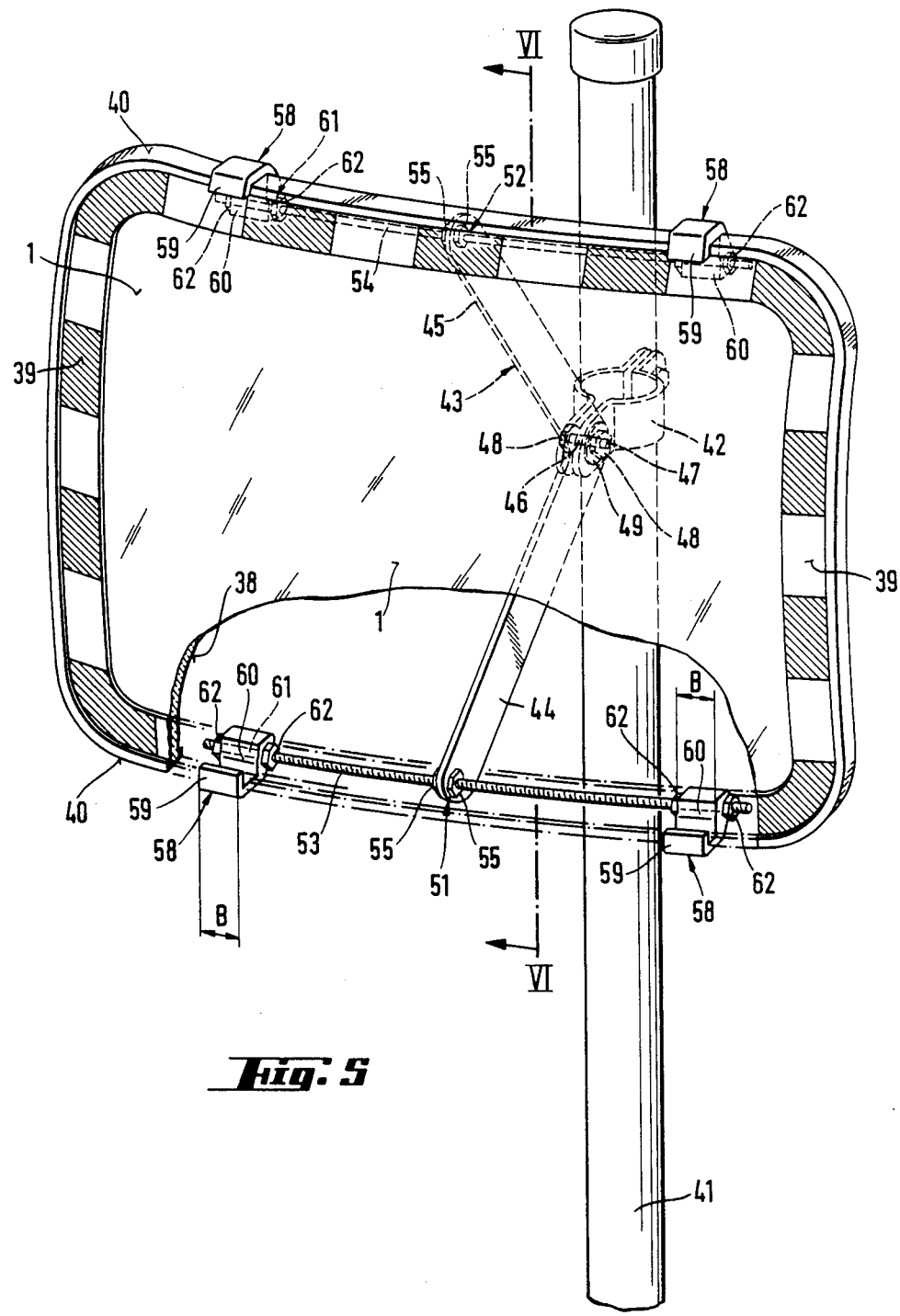
FIG. 5 shows a second embodiment of the traffic mirror in an overall view.
Figure 6:
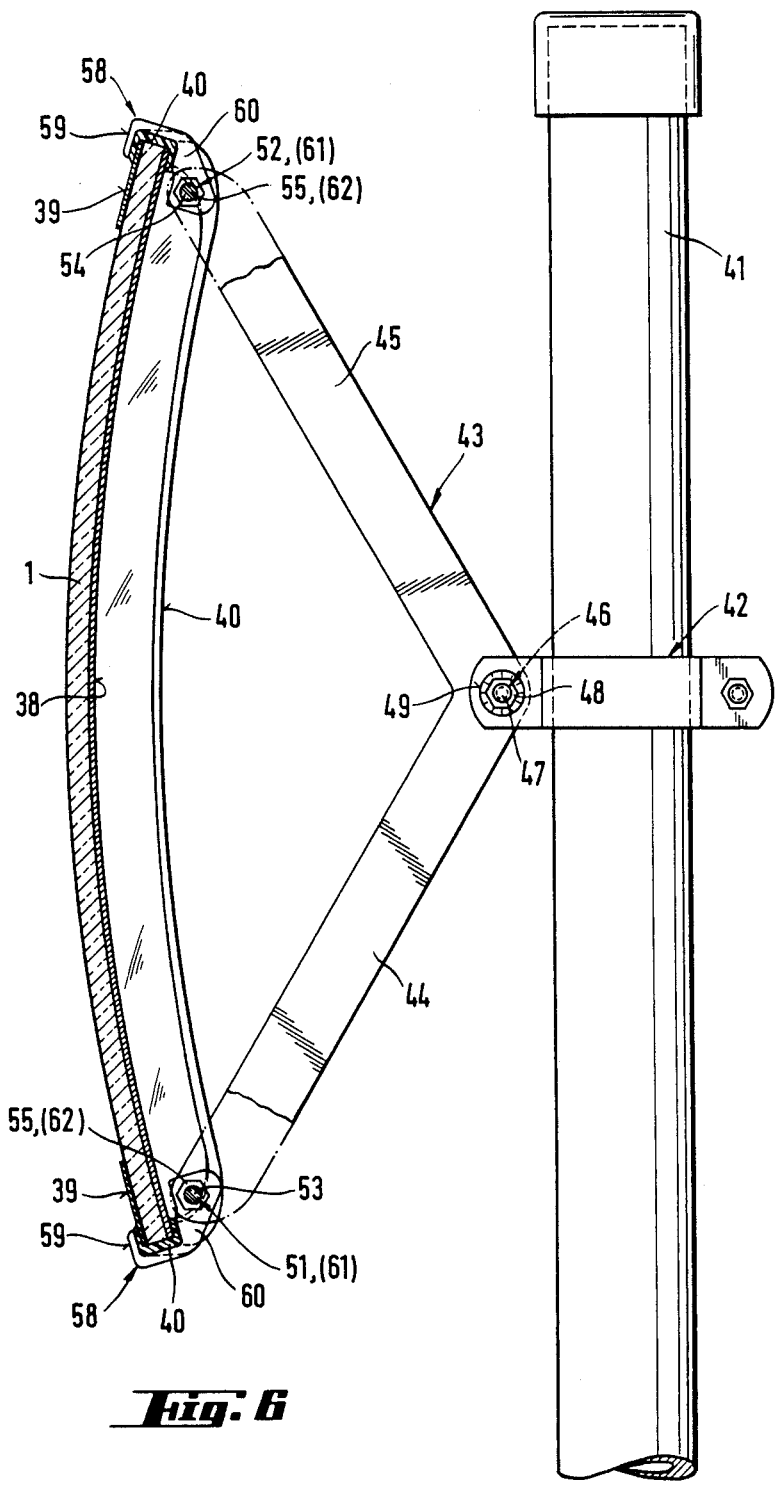
FIG. 6 shows a section through FIG. 5 along line VI—VI.

In the embodiments shown in FIGS. 5 to 7, an angle-shaped supporting plate 43 is used to attach the mirror 1 to the pipe clamp 42. The angle-shaped supporting structure 43 consists of two supporting struts 44 and 45 arranged at an angle. At the apex of the struts 44, 45 is a bore 46. By means of the screw bolt 47, the nut 48 and the fluted disk 49, the supporting plate 43 is firmly screwed together with pipe clamp 42 in the desired angled position and the traffic mirror is attached to the pipe-shaped post 41 by means of said pipe clamp 42.

Each of the supporting struts 44 and 45 is provided at its end with a holding clamp 58 made of an appropriate synthetic material. The holding clamps 58 reach with their forward leg 59 over the edge of the glass pane 1 or over the profile frame 40. The inner distance between the forward leg 59 and the rear leg 60 of the clamp 58 as well as the material of which the clamp 58 is made are chosen so that said clamp 58 is firmly seated on the edge of the glass pane while a certain amount of elastic deformation occurs. The rear leg 60 is provided with a bore 61 by means of which the holding clamp 58 is pushed over the supporting rod 53 or 54. The clamps 58 are attached to the supporting rod 53 or 54 by means of two nuts 62 for each.

According to another embodiment, the rods 53, 54 can also be round rods provided with threads only at their end segments. The round rods can for example be welded together with the supporting arms 44, 45. The clamps 58 can be attached in this case by means of one single nut for each, insofar as an appropriate contact surface for the clamp 58 against the side opposite to the nut is ensured by some other means.

The holding clamps 58 have a width B of approximately 2 to 4 centimeters. Because the supporting rods are made of straight threaded rods which are flexible and capable of being bent, and because the mirror glass 1 has a spherical curvature, the holding clamps 58 are further held in place as a result of the curvature torque which is caused by the elastic bending of the supporting rods. This connection ensures good, permanent attachment of the supporting device on the glass pane.

The embodiment of the supporting device shown in FIGS. 7 is basically of the same construction as the embodiment shown in FIGS. 5 and 6 described earlier, and identical parts have therefore been given the same reference numbers. Contrary to the embodiments described so far, in FIG. 7 the supporting arms 44, 45 have no bores at their ends but are provided with slit-shaped recesses 63 and 64. These slit-shaped recesses 63, 64 are oriented in the same direction, e.g., towards the top, and are open at the top. This ensures easy mounting possibilities for the traffic mirror. The threaded rods 53, 54 are first attached to the mirror glass pane 1 by means of the clamps 58. Independently of this, the angle-shaped supporting plate 43 is attached to the post 41 by means of the pipe clamp 42. After attaching the supporting plate 43, the mirror glass 1 together with the holding rods 53, 54 attached thereto is attached to the holding plate 43 in such manner that the holding rods 53, 54 are hooked from above into the corresponding slit 63, 64. The holding rods 53, 54 are then screwed to the two holding arms 44 or 45 by means of the bolts 55.

While the invention has been described by reference to specific embodiments, this was for purposes of illustration only and should not be construed to limit the spirit or the scope of the invention.

LIST OF COMPONENTS

1 Mirror glass
2 Bore
3 Supporting device
4 Struts
5 Junction plate
6 Strut ends
8 Flat round cap screw
9 Sleeve
10 Intermediary layers
11 Nut
14 Decorative frame
15 Area
16 Area
18 Silver layer
19 Copper layer
20 Lacquer layer
21 Plastic foil
23 Frame profile
25 Ball end spindle
26 Ball
27 Plate
28 Plate
29 Screw
31 Pipe clamp half
32 Pipe clamp half
34 Steel pipe
38 Layer combination
39 Decorative frame
40 Profile frame
41 Post 42 Pipe clamp
43 Supporting plate
44 Supporting strut
45 Supporting strut
46 Bore
47 Screw bolt
48 Nut
49 Fluted disk
51 Bore
52 Bore
53 Supporting rod
54 Supporting rod
55 Nut
58 Clamp
59 Leg
60 Leg
61 Bore
62 Nut
63 Recess
64 Recess

We claim:

1. A traffic mirror, comprising
a spherically curved glass pane having a front surface a rear surface, and an outer periphery,
a metal reflective layer located on the rear surface of said glass plane,
said glass pane including a decorative border comprising a layer of an enamel-like material located directly on said front surface of said glass pane and along said outer periphery, and
a supporting structure for mounting said traffic mirror on a mounting structure, said supporting structure comprising at least two supporting struts each having first and second ends, said supporting struts being attached at their first ends directly to said outer periphery of said glass pane and at their second ends to said mounting structure.

2. The traffic mirror of claim 1 wherein said glass pane is made from thermally prestressed single-pane safety glass.

3. The traffic mirror of claim 1 further comprising at least one protective layer adjacent to said metal reflective layer.

4. The traffic mirror of claim 3 wherein said protective layer is made from a synthetic material.

5. The traffic mirror of claim 1 wherein said enamel-like material is colored.

6. The traffic mirror of claim 1 wherein said enamel-like material is multi-colored.

7. The traffic mirror of claim 1 wherein said enamel-like material contains glass microspheres.

8. The traffic mirror of claim 1 further comprising a protective profile disposed along said outer periphery.

9. The traffic mirror of claim 8 wherein said protective profile is of U-shaped cross-section and receives therein said glass pane.

10. The traffic mirror of claim 1 wherein said glass pane includes at least two bores whereby said supporting struts are attached directly to said glass pane.

11. The traffic mirror of claim 1 wherein said glass pane is substantially of rectangular configuration and includes a bore at each corner, and wherein said supporting structure comprises four supporting struts each of which is attached directly to said glass pane at one of said bores.

12. The traffic mirror of claim 11 further comprising threading means for attaching said four supporting struts to said glass pane at said bores.

13. The traffic mirror of claim 12 further comprising elastic intermediary elements disposed between said threading means and said bores.

14. A traffic mirror, comprising
a spherically curved glass pane having a front surface, a rear surface, and an outer periphery,
a metal reflective layer located on the rear surface of said glass pane,
a decorative frame located directly on said glass pane, said decorative frame contiguously adhering to said glass pane along said outer periphery, and
a supporting structure for mounting said traffic mirror on a mounting structure, said supporting structure comprising two supporting struts each having first and second ends, said two supporting struts having recesses at each of their ends, said two supporting struts being joined at their second ends and being disposed at an angle to each other to define a supporting plate.
said supporting structure further including two rods passing through said recesses at said first ends of said two supporting struts, and extending substantially perpendicular to the plane of said supporting plate, said supporting structure further including clamping means located at the ends of each of said rods for connecting said rods to said outer periphery of said glass pane.

15. The traffic mirror of claim 14 wherein said rods are made of metal and are capable of being elastically deformed.

16. The traffic mirror of claim 16 wherein said rods are welded to said supporting struts.

17. The traffic mirror of claim 14 wherein said rods include threads and said rods are threadingly attached to said supporting struts.

18. The traffic mirror of claim 14 wherein said recesses in said supporting struts are bores which receive said rods.

19. The traffic mirror of claim 14 wherein said recesses are slit-shaped openings into which said rods are hooked.

20. The traffic mirror of claim 14 wherein said clamping means are made from an elastic synthetic material.

21. The traffic mirror of claim 14 wherein said clamping means are of U-shaped cross-section and include a front leg and a rear leg, said rods passing through a bore in said rear leg of said clamping means.

22. The traffic mirror of claim 14 wherein said clamping means have a width of about 2 to 4 cm.

23. A traffic mirror comprising
a spherically curved mirror having an outwardly facing surface and an outer periphery,
said mirror including a decorative border comprising a layer of an enamel-like material located directly on said facing surface of said mirror, and
a supporting structure for mounting said mirror on a mounting structure, said supporting structure being attached directly to said outer periphery of said mirror.

24. The traffic mirror of claim 23 wherein said glass pane is made from thermally prestressed single-pane safety glass.

25. The traffic mirror of claim 24 wherein said enamel-like material is a baked on enamel-like material.

26. The traffic mirror of claim 25 wherein said facing surface is a front surface of said mirror.

27. The traffic mirror of claim 25 wherein said facing surface is rear surface of said mirror.

* * * * *